United States Patent [19]
Imsand

[11] Patent Number: 4,567,513
[45] Date of Patent: Jan. 28, 1986

[54] THREE DIMENSIONAL TELEVISION SYSTEM

[76] Inventor: Donald J. Imsand, 308 Jonquil Ave., Fort Walton Beach, Fla. 32548

[21] Appl. No.: 547,897

[22] Filed: Nov. 2, 1983

[51] Int. Cl.$^4$ ............................................. H04N 13/02
[52] U.S. Cl. ........................................ 358/92; 358/88
[58] Field of Search .................... 358/88, 89, 91, 92, 358/3

[56] References Cited

U.S. PATENT DOCUMENTS

| | | | |
|---|---|---|---|
| 3,457,364 | 7/1969 | Carrillo | 176/6.5 |
| 4,006,291 | 2/1977 | Imsand | 358/92 |
| 4,399,456 | 8/1983 | Zalm | 358/92 |
| 4,429,328 | 1/1984 | Jones, Jr. et al. | 358/88 |

Primary Examiner—Howard W. Britton
Assistant Examiner—Victor R. Kostak
Attorney, Agent, or Firm—Kilpatrick & Cody

[57] ABSTRACT

Methods and apparatus for producing a television image having the illusion of three dimensional depth. This method is compatible with television broadcast standards and standard home TV receivers without additional home apparatus. The basic methodology is to alternate video from two stereoscopic TV cameras, using a synchronized video switch, at an alternation rate to allow the human visual perception process to perceive the two images as a single binocularly fused image. However, this basic method has an inherent flicker problem related to the "limit of binocular fusion" of the human visual perception process. The flicker problem is eliminated through video processing techniques that produce globally converged alternating binocular video. The method is also compatible with display mediums other than television.

30 Claims, 14 Drawing Figures

FIG. 1B — SUPERIMPOSED RETINAL IMAGES WITH EYES CONVERGED ON OBJECT F

FIG. 1C — SUPERIMPOSED RETINAL IMAGES WITH EYES CONVERGED ON OBJECT B

FIG. 1D — IMAGES RECONSTRUCTED FOR CONVERGENCE OF BOTH OBJECTS

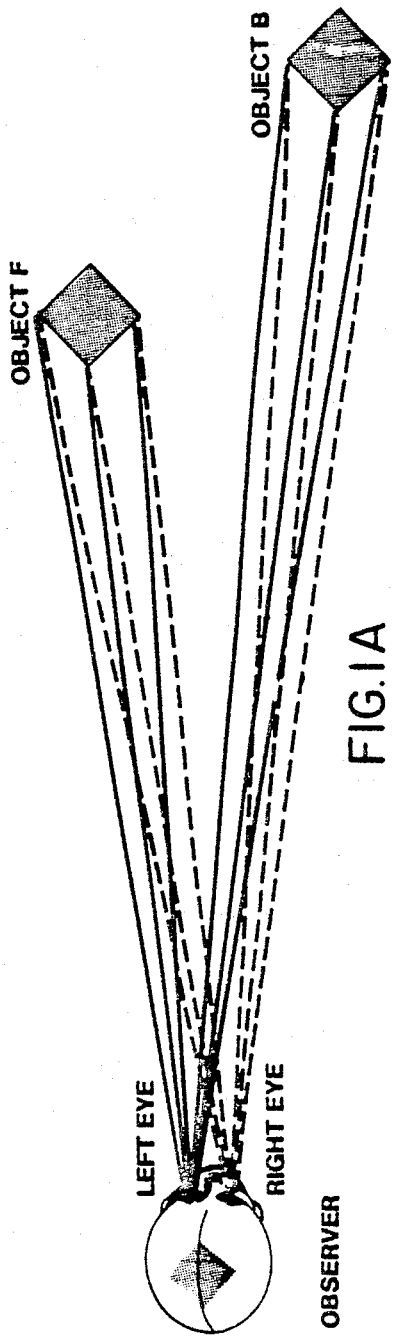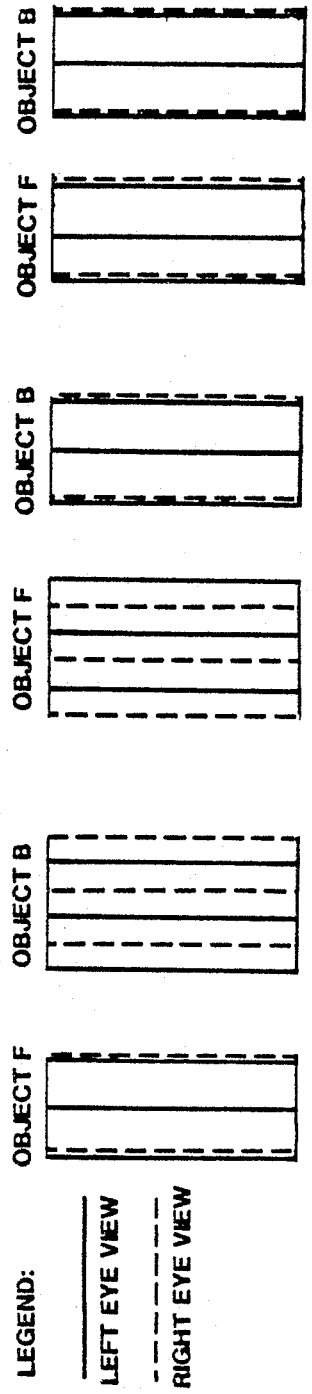
FIG. 1

FIG. 4 SLOPE CORRELATION MEASUREMENT

FIG. 5 VIDEO EDGE DETECTOR/COUNTER

FIG.6 CORRESPONDENCE DETECTOR

FIG. 7 PULSED LIGHT RANGING AND CONVERGENCE SYSTEM

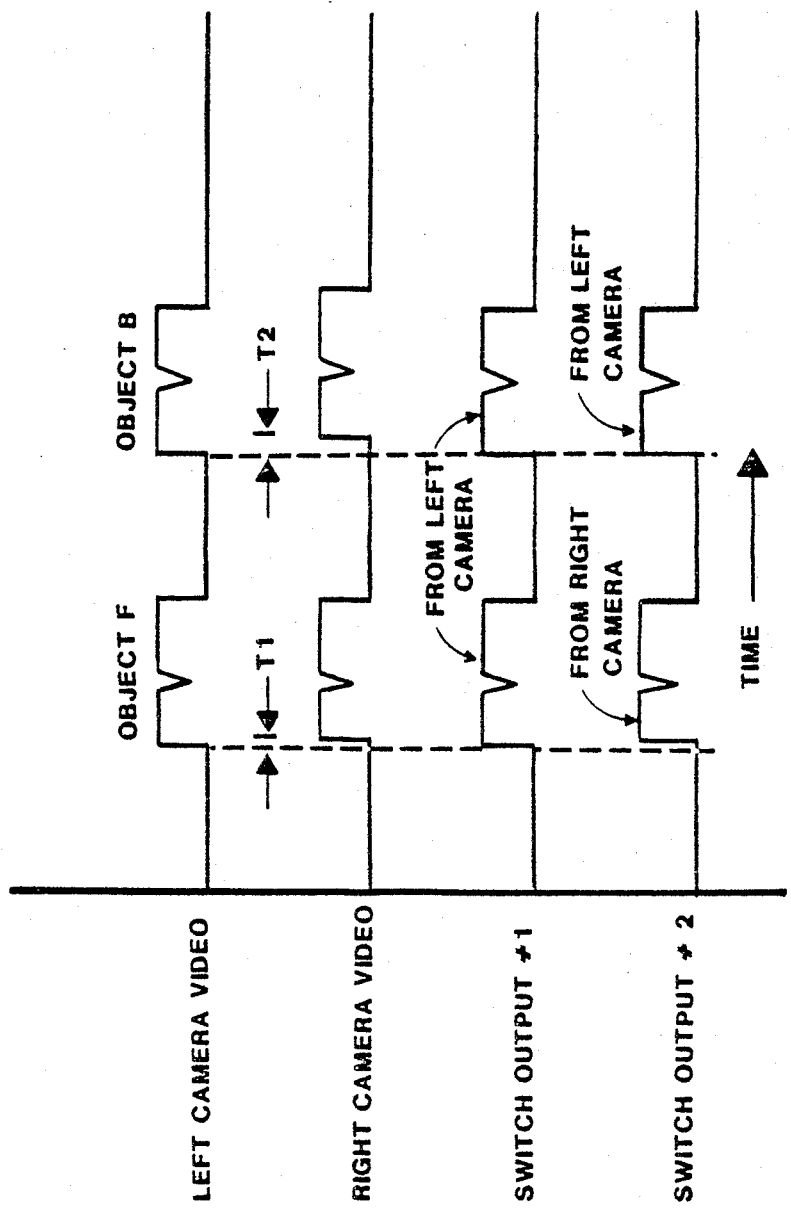
FIG.9 ALTERNATION OF CONVERGED VIDEO

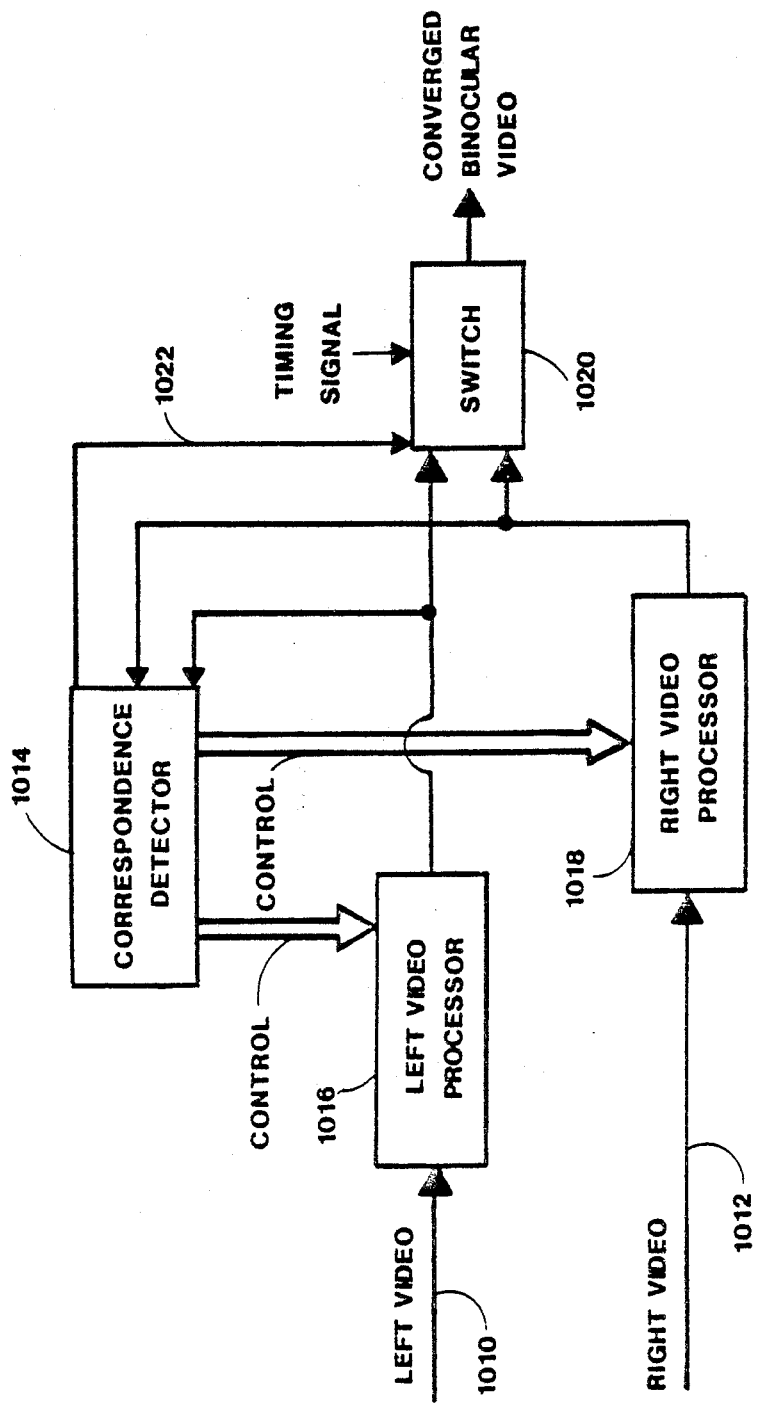
FIG.10 CONVERGENCE VIDEO PROCESSOR

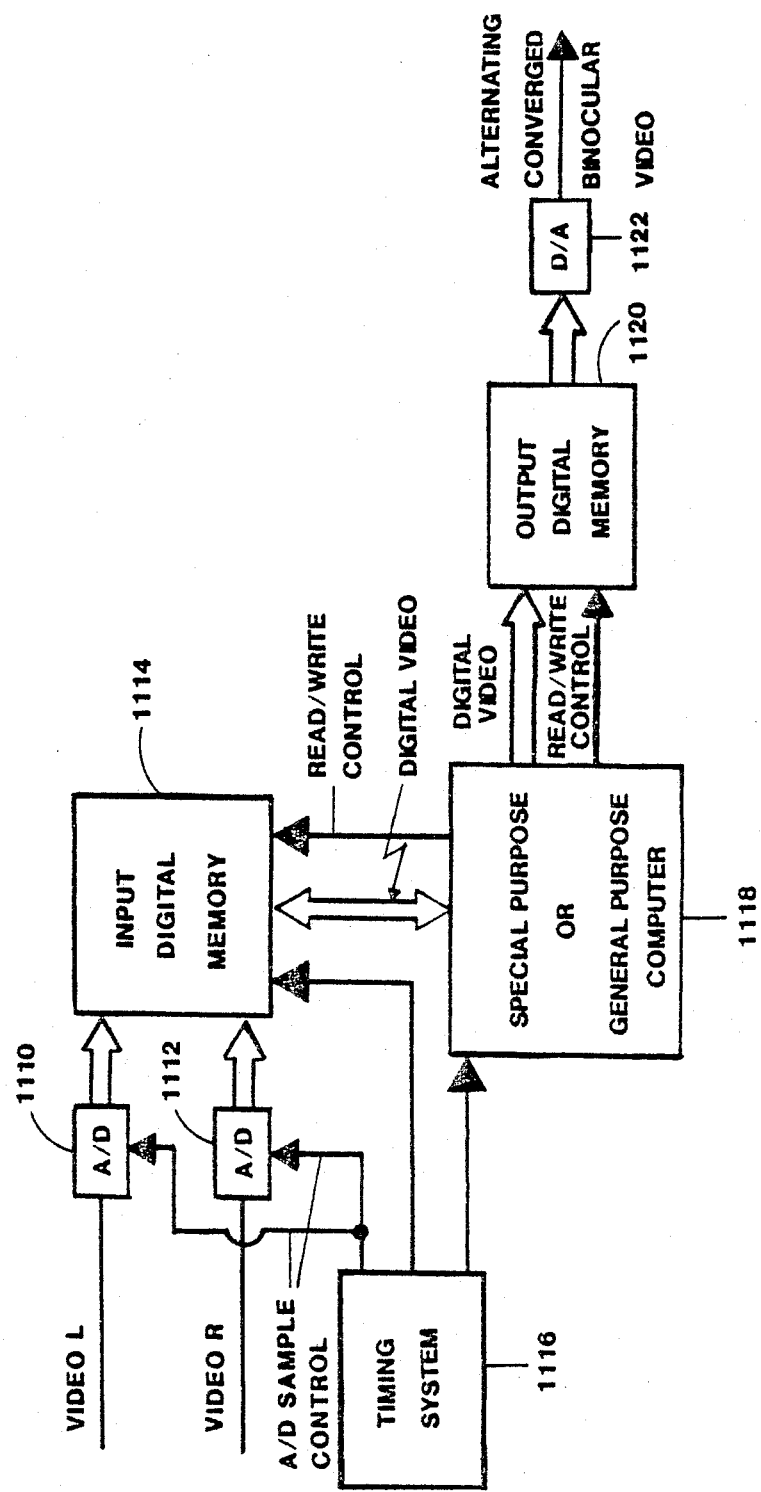
FIG. 11 DIGITAL COMPUTER IMPLEMENTATION OF THREE DIMENSIONAL TELEVISION SYSTEM

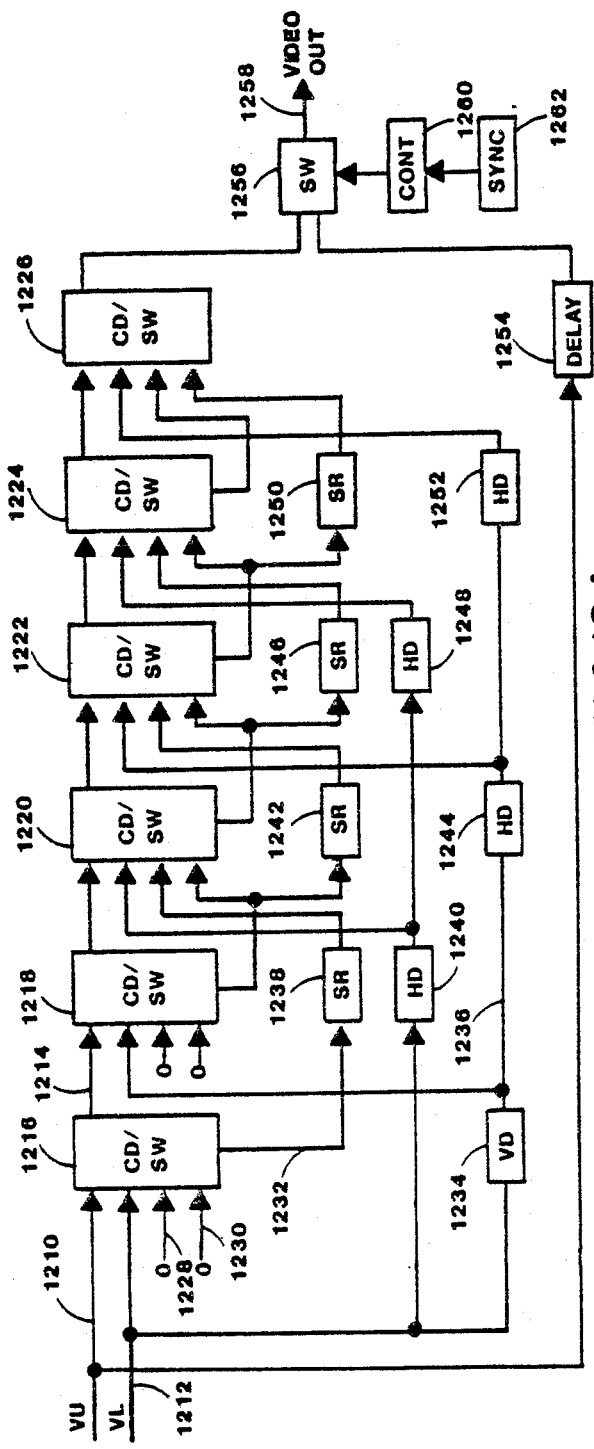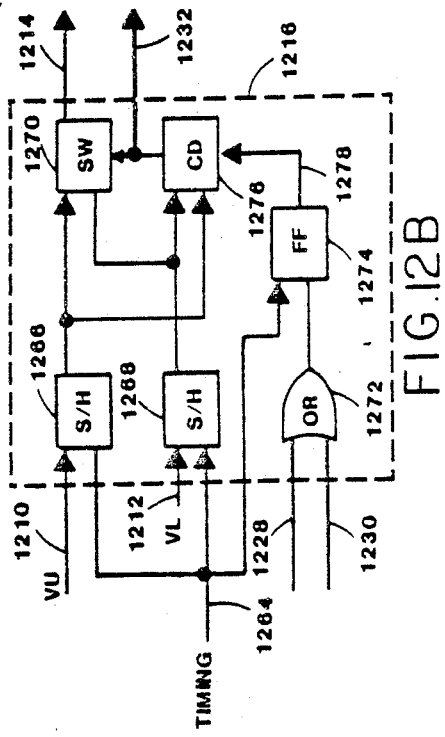

THREE DIMENSIONAL TELEVISION SYSTEM

BACKGROUND OF THE INVENTION

This invention relates to methods and apparatus for producing television images perceived by viewers to be stereoscopic.

Conventional stereoscopic television systems typically require special viewing aids, such as polarized glasses or ones having colored lenses, or special receiving equipment. Typical of the latter approach is the method for producing a three dimensional television image by alternating pictures from stereoscopic television cameras described by Carrillo in U.S. Pat. No. 3,457,364. The method of Carrillo requires a special picture tube for color. In addition, my tests indicate that the alternation method described by Carrillo (approximately 60 alternations per second, 30 of each picture, synchronized to the television field rate) may produce less depth illusion than methods using lower alternation rates.

In U.S. patent application Ser. Nos. 66,722 filed Aug. 25, 1970 and 308,209 filed Nov. 20, 1972, I described a method to produce the desired three dimensional effect while maintaining compatibility with existing broadcast standards and existing home TV receivers. However, when the two stereoscopic cameras are converged on foreground objects, in accordance with that method, background objects sometimes appear to flicker and jump. Similarly, when the cameras are pointed at background objects, foreground objects may appear to flicker and jump. The main contributor to this flicker and jump effect is the limit of binocular fusion of the visual perception process in combination with the flicker effect of the low alternation rate. The limit of binocular fusion phenomenon was first investigated by Panum in 1856 and is known to visual perception scientists as the limiting case of the Panum Phenomenon as disclosed in Rosenblith, Walter A. (editor), Sensory Communication, John Wiley & Sons, 1961, which discusses, in chapter 32, the physiological basis for the perception of binocularly fused images as a result of the alternation of stereo images and which is incorporated herein by reference in its entirety.

Efforts to reduce the detrimental effects of this limit of binocular fusion while still maintaining a three dimensional effect produced my invention described in U.S. Pat. No. 4,006,291. But the method of this invention did not completely correct the problem since it is designed to minimize the effects but does not correct or remove the cause.

The method of Carrillo does not have a flicker problem since the alternation rate is far above the critical flicker frequency described in visual perception literature. However, the limit of binocular fusion problem manifests itself as a double image.

BASIC THREE DIMENSIONAL ILLUSION METHODOLOGY

Human visual perception of three dimensions requires, in part, stereo images, one image corresponding to each eye, viewed from slightly different angles corresponding to the separation of the eyes. This causes each eye to see a slightly different image. Consequently, most three dimensional movie and television systems require the viewer to use some apparatus such as polarized glasses, color filter glasses or a mechanical shutter viewer in order to cause the left camera image to be viewed by the left eye and the right camera image to be viewed by the right eye.

However, a less obvious method is to simply alternately expose the two stereo images to both eyes of the viewer. The three dimensional illusion is produced by presenting stereoptican pairs of images to both the viewer's eyes, one image partner at a time, first one then the other, alternated several times per second. The normal visual perception process, through its significant adaptive and integrating capabilities and the physiology of the visual perception process, will interpret the images as a single three dimensional image, so long as the images are alternated such that binocular fusion can take place.

The visual perception system does not care which eye sees which image. As long as there is a disparity in the two images and as long as the two images are within some range of corresponding binocular positions, a correct depth relationship will be perceived. The visual cortex apparently measures the disparities in the two images to determine the depth of an object. A depth illusion system must provide some means to present the images such that the visual cortex can perform this measurement.

The first paragraph of this section contains a simplification that should now be clarified since this clarification is pertinent to the present invention. The implication that 3D movies or television require the stereo cameras to be horizontally separated corresponding to the horizontal separation of the eyes is not completely accurate. My experiments indicate the two cameras can be vertically (or diagonally) separated and still achieve the depth illusion. This result is implied by tilting one's head to the side while viewing a 3D movie; the stereoptican depth illusion is still present even with the head tilted a full 90 degrees. This perception response to vertical disparity is also supported by visual perception literature such as "Stereopsis" by J. Mayhew in "Physical and Biological Processing of Images", edited by Braddick, O.J. and Sleigh, A.C., Springer-Verlag, 1983 and Pettigrew, John, The Neurophysiology of Binocular Vision, Scientific American, August, 1972, both of which are incorporated herein by reference.

In my method described in U.S. patent application Ser. No. 308,209, filed Nov. 20, 1972 and now abandoned, the stereo images are alternated at a rate near or below the critical flicker frequency. This is so that some of the retinal receptors can discharge to the visual cortex under the influence of one of the stereo images and other retinal receptors will discharge to the cortex under the influence of the other image in a time multiplexed fashion. Since the neuronal charges persist for some short time interval, the different charges from the disparate stereo images can interact in the binocular fusion process and depth is perceived.

The alternation rate of my method can vary, but generally should be on the order of 3 to 25 of each image per second. The relative exposure time of the two partner images can vary from equal exposure time of each to the subliminal exposure technique involving significantly unequal exposure times of my U.S. Pat. No. 4,006,291.

However, when the two cameras are pointed at a foreground object (that is, converged on the foreground object), background objects may appear to jump. Likewise, when the two cameras are pointed at a background object, foreground objects may appear to jump. The problem, which may appear to be caused only by the "flicker phenomenon", is actually caused by a combination of the flicker phenomenon and by the limit of binocular fusion first described by Panum. It should be emphasized here that converged binocular video does not flicker or jump. Unconverged binocular video does flicker and jump.

The differences in the characteristics of the Carrillo and the Imsand methods suggest of a very basic difference in the way the two methods function in the perception process. The Carrillo alternation rate is well above the critical flicker frequency; hence it has no flicker problem. This implies, however, that all retinal receptors discharge to the visual cortex under the influence of both stereo images. The Carrillo monochrome method also uses a spacial separation by placing the two stereo images on alternating interlaced lines, thus assuring that the two images are present on a space separation basis rather than a true time multiplex basis. The resolution, focus and electron beam sharpness of color picture tubes was not adequate at the time of Carrillo's invention to provide the necessary spacial separation for color applications. Thus, Carrillo found it necessary to use two contrasting colors, implemented with a special color picture tube, to keep the two disparate stereo pictures separated in the visual cortex so that binocular fusion could take place.

The methods and apparatus described herein to resolve the flicker problem of the Imsand method can also be used to resolve the double image problem of the Carrillo method.

In order to better explain the present invention a few elements of depth perception as related to the present invention will now be reviewed. The monocular cues to depth perception are not pertinent to the invention and are not included.

BINOCULAR ELEMENTS OF DEPTH PERCEPTION

Two important cues to the visual perception of depth are binocular cues of convergence and stereoscopic vision.

CONVERGENCE

When an object is at a great distance, lines of fixation to the object from a viewer's separate eyes are nearly parallel. When the object is near, the viewer's eyes are turned toward the object and the fixation lines converge at a more noticable angle. If a person fixates his eyes on his finger at arm's length and then moves his finger in toward his nose while maintaining the fixation with his eyes, the eyes will "cross". This crossing or "pointing in" of the eyes is detectable by the sensory/control system that controls the position of the eyeballs and produces a sensation of more depth or less depth according to the size of the convergence angle of the eyes. However, visual perception scientists generally agree that convergence is a relatively minor cue to depth perception. Probably a more important result of convergence is that it also serves to place the two right and left eye images of the object fixated upon at (very nearly) corresponding retinal points in the central retinal area of each eye.

When the eyes are fixated (converged) on a point, the theoretical locus of all points whose images fall in exact retinal correspondence can be shown by geometric analysis. When the eyes are fixated on a point at the same elevation as the eyes, the locus of points in the horizontal plane lie on the circumference of a circle passing through the two eyes on one side of the circle and the convergence point on the other side of the circle. When this circle is rotated about an axis passing through the two eyes, the resulting donut shaped solid surface defines this locus of points in three space. The resulting locus of points are obviously not at a constant distance from the eyes. However, since binocular fusion only takes place in a small area of the central retina, for practical purposes the locus of points of exact retinal correspondence may be considered to be at the same distance and in the vicinity of the point the eyes are fixated upon.

STEREOSCOPIC VISION

When a person looks at an object, the retinal image in the right eye is different (disparate) from the retinal image in the left eye. This disparity is the result of the two eyes viewing the object from the two slightly different positions. Experiments have shown that the human visual perception system is highly sensitive to the disparity of the two retinal images. The visual perception system uses the amount of disparity as a measure of the depth of the object being viewed, with increasing disparity being perceived as the object being closer. No disparity is perceived as a far background object. Studies of visual perception have shown that this stereoscopic vision phenomenon is a much more important cue to depth perception than convergence.

BINOCULAR FUSION

When an object is viewed by the two eyes, although the two retinal images may be different, only a single image is normally perceived. This phenomenal process which takes place in the visual cortex of the sensory system is known as binocular fusion.

LIMIT OF BINOCULAR FUSION

When the two eyes are converged on an object several feet away, two slightly different images will be viewed by the two eyes but only one binocularly fused image will be perceived. If a second object is immediately beside the first object, it also will be perceived as a binocularly fused image. If the eyes remain fixated (converged) on the first object and the second object is moved further away into the background, a simple geometric projection analysis (see FIGS. 1A and 1B) will show that the difference in retinal correspondence in the retinal images of the background object will increase. When the difference gets large enough, the sensory system can no longer binocularly fuse the object and a double image will result. When this occurs, the limit of binocular fusion has been reached. This is discussed as "Panum's limiting case" in Chapter 5 of Murch, Gerald M., Visual and Auditory Perception, Bobbs-Merrill Company, 1973, which is incorporated herein, by reference, in its entirety.

When the eyes are shifted and fixated on the background object, the background object will again become binocularly fused and the foreground object will become the double image (see FIGS. 1A and 1C).

ACCOMMODATION

The viewer is not normally aware of a double image even though it may be present in most complex scenes. This is because when the eyes are converged on the foreground object they are also focused on that object and the double image of the background object is out of focus and is autonomously de-emphasized via the accommodation property of the visual perception process. Some texts indicate that accommodation is (only) the focusing of the eyes' lenses. However, the de-emphasis that may take place in the visual cortex also causes the viewer to be unaware of the out of focus double image.

The interaction of convergence and binocular fusion in binocular depth perception is recognized in visual perception literature as a complex process (refer to Julez, Bela, Foundations of Cyclopean Perception, University of Chicago Press, 1971, which is incorporated herein by reference in its entirety). However, the following simplifications are consistent with visual perception literature and are pertinent to the present invention.

1. The visual perception system controls eye convergence in a manner that tends to maximize the correlation (or retinal correspondence) of the left and right eye images of the object of attention within some central portion of the retina.

2. The resulting two disparate images are processed by the visual cortex to determine (relative) depth by measuring the disparities and to resolve the disparities, merging the two images into a single perceived image.

Three dimensional reproduction systems are a paradox—movies, television or any system that tries to reproduce a three dimensional image on a flat screen. To recreate the same conditions more exactly would imply that the stereo cameras convergence be a priori synchronized with the viewer's eye convergence as he shifts his gaze from foreground to background. Indeed, existing 3D movies have double image problems in some complex scenes. The problem is not as obvious in 3D movies that use special glasses to separate the stereo images, but it is still there.

In the display or projection of moving video scenes, as with movies or television, the picture update rate (60 fields, 30 frames per second for television) is well above the critical flicker frequency, thereby providing the well known illusion of a continuously moving picture. However, the stereo partner alternation rate in accordance with my invention works better with a lower alternation rate, close to or lower than the critical flicker frequency. This may be because a lower rate permits neuronal binocular rivalry to take place in the visual cortex, resulting in the perception of depth. If such lower rate alternated stereo object images are adequately converged the picture alternation rate is not perceptable and no flicker results. However, if the partner object images exceed the limit of binocular fusion, the partner images jump and flicker at the partner alternation rate. If the partner alternation rate is increased, the flicker diminishes, but continuous double images result for object images outside the limit of binocular fusion and for object images within the limit of binocular fusion, the three dimensional illusion is reduced and a continuous fuzzy-edged object results.

With a three dimensional reproduction system, it would seem impossible to keep all corresponding elements of a complex scene within a viewer's limit of binocular fusion. As a person shifts his gaze from foreground to background objects in real three dimensional scenes, the convergence angle of his eyes changes thereby changing the relative position of the foreground and background object images on the retina as shown in FIGS. 1B and 1C. However, in 3D reproduction systems the viewer's eyes are converged on the screen. The viewer's eye convergence angle could change as the viewer's gaze changes from foreground to background in the stereo reproduction scene. However, a careful geometric projection analysis will reveal that since the cameras are converged on the object of primary interest only (foreground for example), when the viewer's gaze shifts to the background object, proper retinal registration of the background object image would require an unnatural convergence angle for the eyes.

SUMMARY OF THE INVENTION

This invention provides video processing systems that will process stereoscopic video signals such that all necessary objects in the stereo reproduced image is within a viewer's limit of binocular fusion, thus allowing binocular fusion without the jumping effect in foreground or background. This may be accomplished by either of two general methods. One method is to alternate stereo video only from objects that are within the limit of binocular fusion. For objects out of the binocular fusion region only video from one of the cameras would be passed, but that video would be passed all the time. The second method rearranges the video from all necessary objects such that the stereo images of each object in the scene, background and foreground, are arranged for binocular fusion (as illustrated in FIG. 1D) to take place.

In accordance with this invention a stereoptican pair of images is presented, one partner at a time but alternating the two images, with each partner exposed to both eyes simultaneously. The alternation rate is on the order of 3 to 25 of each picture per second, but may be varied for optimal effects. The relative exposure time of each of the partners may be equal or may also be varied for optimal effects.

"Layered video techniques" generate converged binocular video combined with monocular video such that the limit of binocular fusion problem is eliminated.

Additional techniques are presented to detect corresponding elements in the two electronic video signals from two video cameras and to detect when corresponding elements of the two electronic video signals would cause the reproduced stereo elements to exceed the viewer's limit of binocular fusion.

These techniques are combined with methods and apparatus to combine parts of each pair of stereo images such that corresponding stereo elements within the viewer's limit of binocular fusion are alternated, but when the corresponding elements would be outside the limit of binocular fusion, only one of the stereo video signals for that element would be passed all the time with no alternation. Stereo elements that are alternated would appear to have depth while unalternated elements would appear as background (or foreground) elements.

Additional techniques are provided to rearrange video information in either one or both stereo electronic video signals such that all necessary video information from a scene, foreground and background, are within a proper binocular relationship such that when the two stereo partners are alternated at the appropriate partner alternation rate a single binocularly fused image will be perceived having the illusion of three dimensions. With these techniques, corresponding video elements that would otherwise be out of the limit of binocular fusion are repositioned such that they are within the limit of binocular fusion.

The above techniques may employ normal horizontal scan TV cameras and horizontal separation of the stereo cameras. Additional techniques will be presented involving vertical separation of the stereo cameras and vertically scanned TV cameras. These techniques may significantly reduce the video signal processing necessary to achieve globally converged stereoscopic video. (For the purpose of this discussion, "globally converged" means stereoscopic video all corresponding elements of which are within the limit of binocular fusion throughout the reproduced image.)

A further object of this invention is the production of methods and devices for three dimensional image production which is adaptable to (standard and non-standard) television broadcasting, closed circuit television, and artificial image production as used in video games, motion picture cartoons, television cartoons, and similar applications. These video processing techniques are also adaptable to motion picture production.

BRIEF DESCRIPTION OF THE DRAWINGS

FIGS. 1A-1D are drawings illustrating the geometry of binocular vision.

FIG. 9 is a signal diagram to illustrate the alternation of converged video elements.

FIG. 10 is a block diagram of a system to process stereoscopic video to bring all corresponding video object elements within the limit of binocular fusion.

FIG. 11 is a block diagram of a digital computer implementation of a stereoscopic video processing system to produce alternating stereoscopic video such that all corresponding video object elements are within the limit of binocular fusion.

FIG. 12A and 12B is a block diagram of a stereoscopic video processing system for vertically separated stereoscopic TV cameras. The block diagram is also applicable for horizontally separated, vertically scanned TV cameras.

DETAILED DESCRIPTION OF THE DRAWINGS

FIG. 1A is a plan view diagram of a human observer and the lines of sight from each eye to a foreground object F and a background object B presented to assist in explaining the present invention.

FIG. 1B is a simplified illustration of the superimposed retinal images for the observer of FIG. 1A when his eyes are converged on the foreground object F.

FIG. 1C is a simplified illustration of the superimposed retinal images for the observer of FIG. 1A when his eyes are converged on the background object B.

FIG. 1D is a simplified illustration of the superimposed retinal images when the video has been processed in accordance with the present invention to simulate simultaneous convergence of the viewers eyes on both object F and object B, thus allowing binocular fusion of both objects.

Figure 2:
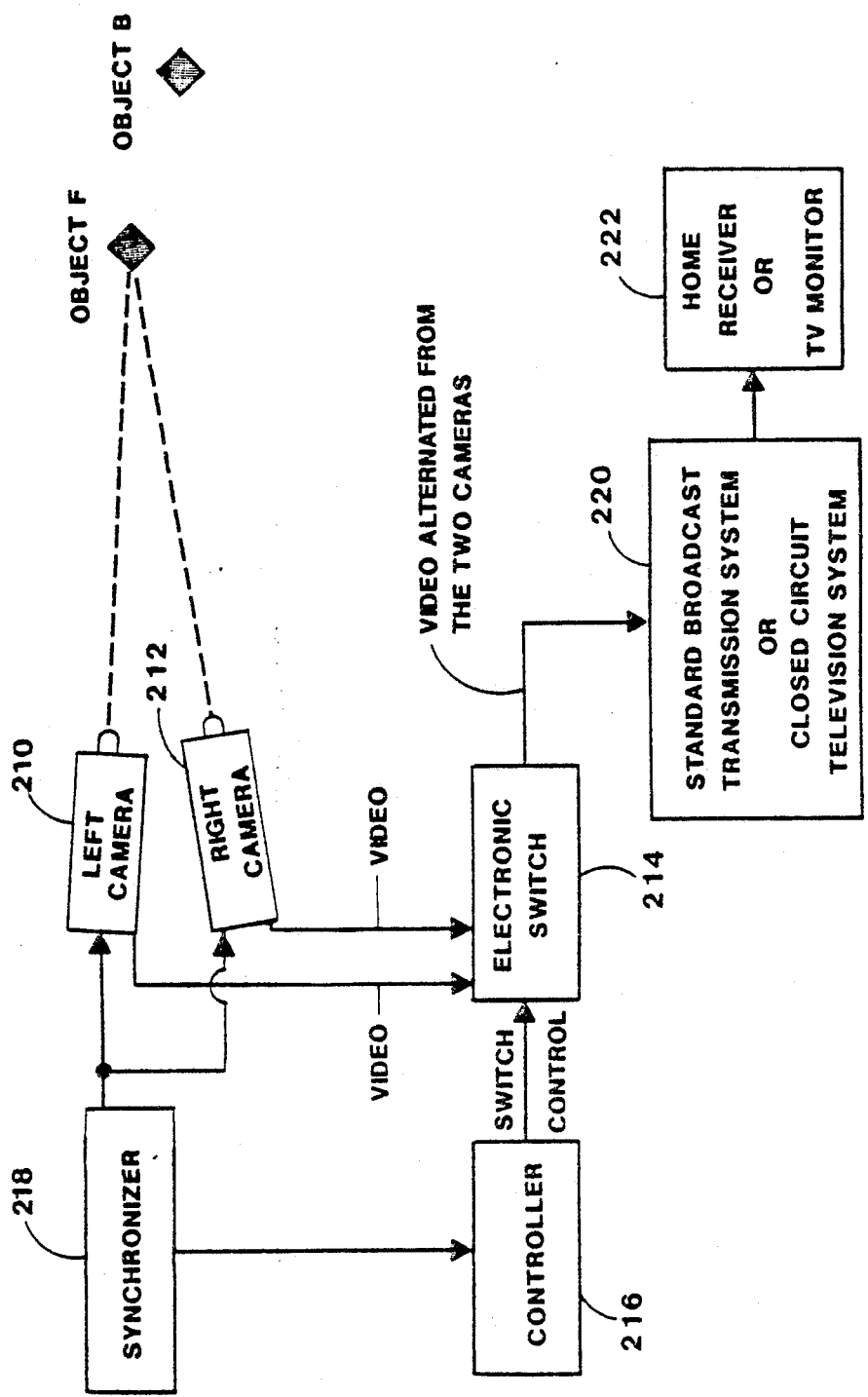
FIG. 2 is a block diagram of a basic embodiment of a three dimensional television system in accordance with the present invention.

Referring to FIG. 2, two television cameras, 210 and 212, with identical optics are correctly spaced and aimed for taking pictures which have a stereo relationship to each other. The cameras are shown converged on object F. A video switch 214 allows video from one camera and then the other camera to pass, under the command of a controller 216 for controlling the switch 214, and a video synchronization generator 218 synchronizes the controller 216 and the video of the two cameras. The transmission medium 220 sends video selected by switch 214 to monitor 222.

The embodiment of FIG. 2 is not specifically designed to reduce or eliminate the limit of binocular fusion problem; however it could be used where all video elements are at a relatively equal distance from the cameras.

The two cameras 210 and 212 are aimed and focussed on the desired object, and the video signals from the two cameras are synchronized by the synchronization generator 218. The video from the two cameras is applied to the video switch 214. The controller 216 receives synchronization signals from the synchronization generator 218. The controller 216 controls the switch 214 to allow the video first from one camera to pass then from the other camera to pass. The video from the two cameras are alternated at a rate from about 3 to 25 of each picture per second and may be adjusted for optimal effect. Each channel may be exposed for equal amounts of time. However, relative exposure times may be varied for optimal effects and the techniques of U.S. Pat. No. 4,006,291 applied to this invention.

Experiments indicate that the optimal alternation rate may be a function of the light intensity of the video scene. This result is supported by the writings of Robert Efron, Stereoscopic Vision, in the British Journal of Opthalamology, December, 1957. Therefore, the alternation rate can be somewhat optimized for changing video scenes by using a light meter to measure the light intensity of the video scene and operatively connecting the meter output to circuitry that controls the alternation rate of the stereo video signals. An alternate approach is to electronically measure the amplitude of the video signal, the amplitude being a function of light intensity.

LAYERED VIDEO TECHNIQUES

Layered video techniques are generally applicable when parts of the video scene can be photographed separately and combined via "special effects" techniques often used in the video industry. For example, a singer against a solid color background can be photographed producing converged binocular video of the singer. The orchestra can be photographed separately with monocular video. Then using existing special effects circuitry, the solid color background can be detected and replaced with the monocular video. This method would produce an image of the singer with the depth effect of the converged binocular video and with the orchestra appearing in the background as monocular video but without any flicker or jumping in any portion of the entire resulting picture.

Many variations of this technique are feasible. For example, in the previous example the orchestra could be photographed with stereo cameras (but a different stereo set from that for the singer) and combined with the singer stereo image. Additional layers of video can also be combined. The several binocular videos can be combined in real time or video tape recordings can be used, but all must be properly synchronized and converged.

CORRESPONDENCE DETECTION TECHNIQUES

Since a TV camera scans a scene horizontally as a function of time, the relative time of occurrence of corresponding stereo video elements within a horizontal scan can be used to determine if each corresponding stereo element pair is within the limit of binocular fusion. This correspondence detection can be used to implement alternation of converged stereo video elements while maintaining continuous video from one camera for unconverged video. (For the purpose of this discussion, a "video element" may be loosely defined as a video signal from the smallest discernible part of a single object in the video scene. "Corresponding video elements" are video elements in the two stereo video signals that originate from the same small part of the same object in the video scene.)

The first step in determining if the corresponding video elements are within the limit of binocular fusion is to identify the corresponding elements through correlation measurement techniques. Correlation measurement can be implemented in various ways. Correlation can be based on amplitude comparison between the two video signals (FIG. 3), slope comparison between the two video signals (FIG. 4), edge correspondence measurement between the two signals (FIG. 5) or other time domain techniques. Frequency domain techniques can also be utilized; that is, by detecting corresponding frequencies in the two signals. Combination of the above techniques is often necessary. Correlation measurement can be accomplished on monochrome signals, color signals, or combinations thereof. The correlation measurement can be accomplished through analog techniques or the video signals can be digitized and digital techniques utilized. A good combination technique for color signal correlation measurement is the combination of the light intensity signal and the color signal. The correlation measurement can be accomplished in the vertical direction, horizontal direction or in a combination vertical and horizontal direction. The two direction technique is more easily implemented utilizing the digital techniques and algorithms of picture processing via digital computer.

Logic circuitry designed to indicate that the elements correspond is utilized to detect when two video elements in the two stereo video signals are sufficiently correlated.

Figure 3:
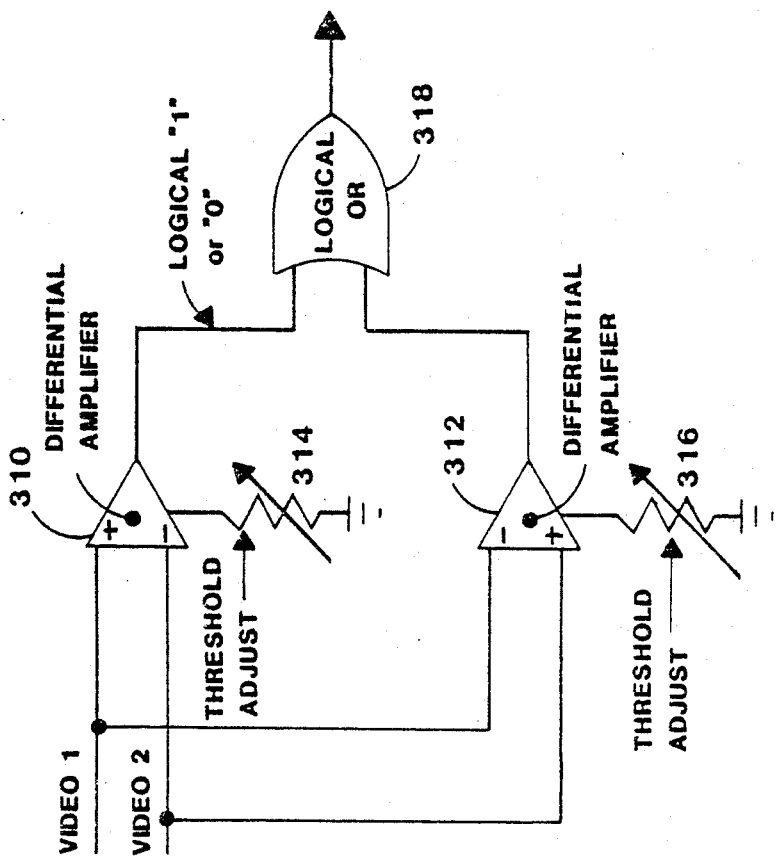
FIG. 3 is a logic diagram illustrating amplitude correlation measurement.

FIG. 3 is a simplified illustration of an amplitude correlation measurement device that measures the amplitude difference between the two stereo video signals, video 1 and video 2. A video differential amplifier 310 amplifies the difference between the two video signals. Threshold (gain) adjustment 314 is used to adjust the gain of amplifier 310 so that when video 1 is an appropriate amount above video 2, the output of amplifier 310 will cause the output of the logical OR gate 318 to be in the "1" state indicating the signals are not adequately correlated. Amplifier 312 is identical to amplifier 310 but is connected with opposite polarity to the two video signals. Thus, when video 1 amplitude is a threshold above or below video 2, the OR gate outputs a "1" indicating noncorrelation. If the two video signals are nearly equal, the OR gate outputs a "0" indicating correlation.

Figure 4:
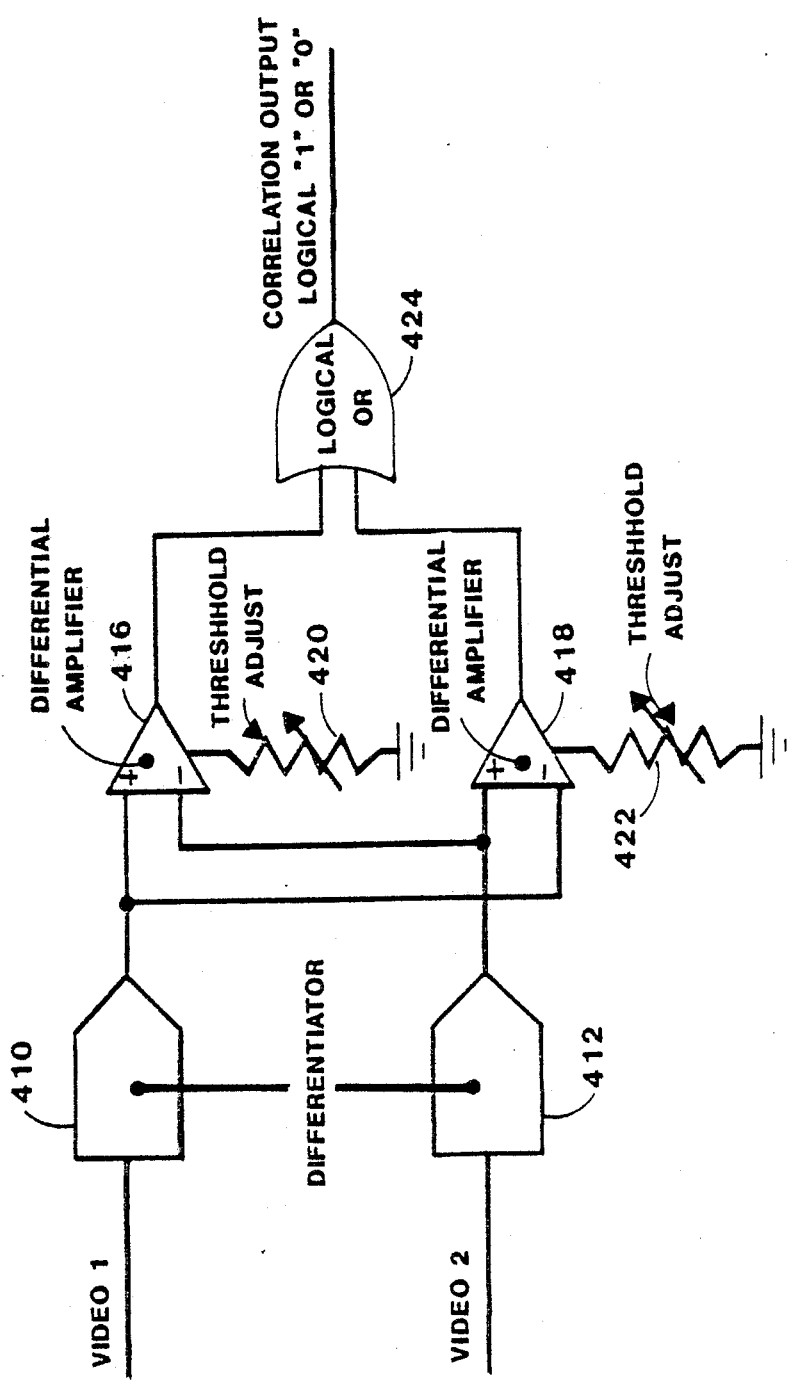
FIG. 4 is a logic diagram illustrating slope correlation measurement.

FIG. 4 is a simplified illustration of a slope correlation measurement device that measures the difference in the slopes of the two video signals. Items 410 and 412 are video amplifiers connected as differentiators such that their outputs are proportional to the slopes of the video signal inputs. The differential amplifiers 416 and 418, threshold adjustments 420 and 422, and logical OR gate 424 function the same as in FIG. 3. Thus, when the two signals slopes are nearly equal, the logical OR gate 424 outputs a "0" indicating the slopes are adequately correlated. Otherwise a "1" is output indicating the signals are not adequately correlated.

Figure 5:
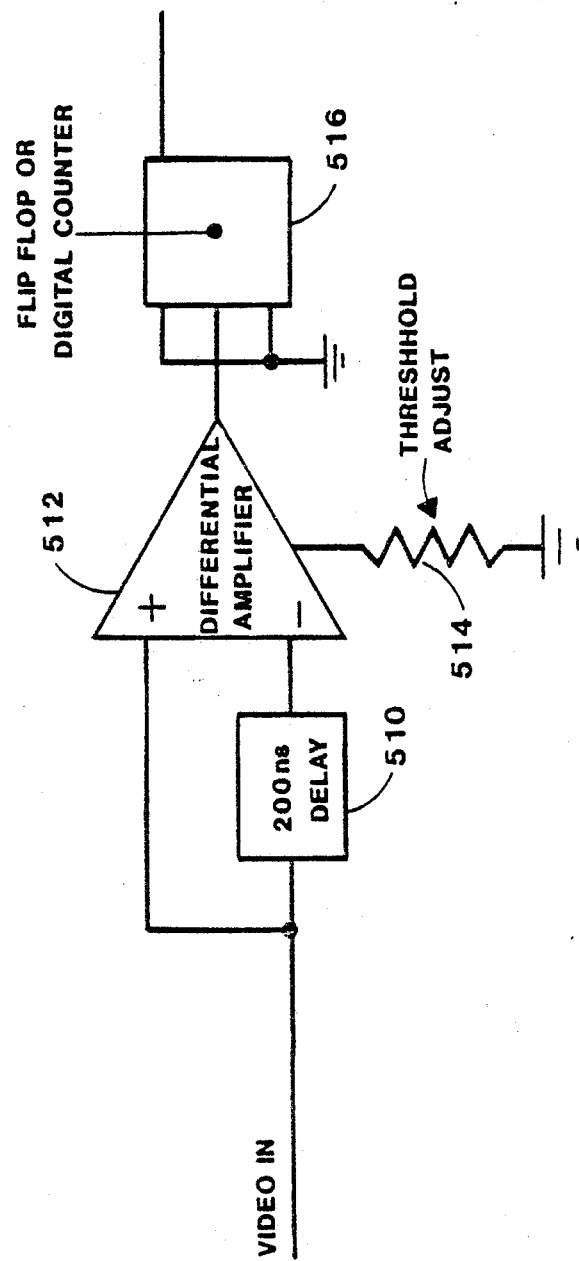
FIG. 5 is a logic diagram illustrating a video edge detection system.

FIG. 5 is a simplified illustration of a video edge detector. A video signal is connected to one terminal of a differential video amplifier 512 and through a video delay line device 510 (such as a video sample and hold circuit) to the other terminal. The amount of delay is illustrated as 200 nanoseconds but may be changed for optimal results. If the video signal changes by some threshold amount within the 200 nanoseconds, the amplifier 512 output will cause the digital counter or flip-flop 516 to change state, indicating a video edge has occurred. A threshold adjustment 514 is included to adjust the amount of video signal change necessary to signify an edge, as the application requires.

Figure 6:
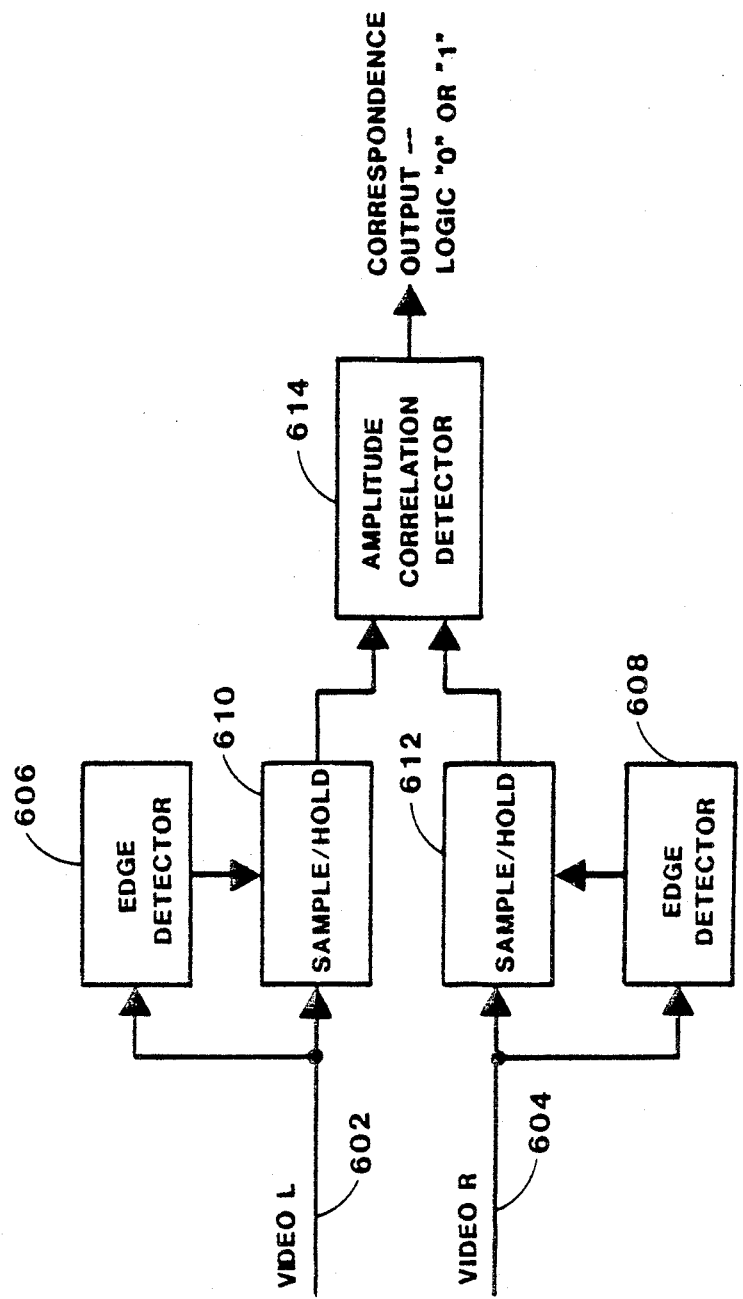
FIG. 6 is a block diagram of a system to detect when video elements in two stereoscopic video signals correspond.

An implementation of a correspondence detector will now be described for a simple video scene. Referring to FIG. 6, properly synchronized left and right stereo video inputs are fed simultaneously to edge detectors 606 and 608 and sample and hold circuits 610 and 612. Each edge detector 606 and 608 detects when each video object begins and sends a signal to corresponding sample and hold circuit 610 and 612. Each sample and hold circuit 610 and 612 samples the signal immediately after the edge (for example, 200 nanosecond sample window) and holds its respective signal for input to the amplitude correlation detector 614. The amplitude correlation detector 614 compares the amplitudes of the two sampled signals and outputs a "1" when the signals are adequately correlated and a "0" when the signals are not adequately correlated. Adequately correlated signals may be said to "correspond".

It is apparent that an important part of correspondence measurement and detection is the sensing or detection of the edges of the various objects in the video scene. Special techniques can be used to identify the edges of the video objects to separate the various foreground, midground and background elements. For instance, foreground objects can be backlighted with ultraviolet or infrared light. One or both of the cameras can be outfitted with a prism video splitter and a special "vidicon" that is sensitive to the back light. The special vidicon can be scanned in the same manner as the regular video sensing element and the signal from the special vidicon will help identify the edges of the backlighted video objects.

"Range gating" can also be used to identify the video element edges as a function of range from the cameras. The amount of video shifting necessary to allow binocular fusion is a function of the range of the video object from the cameras. However, range is not usually measured or determined by a camera. Radar systems can measure range by transmitting short bursts of energy or pulses. Since the pulses travel at a specific velocity, range to an object can be calculated from the time it takes the pulse echoes to return from the object. Radar range to the object is measured by taking short sequential time samples (range gates) of the reflected energy to determine the time of arrival of the energy reflected from the object. This principle can also be used to implement edge detection of the various objects as a function of range to the objects, the video shifting necessary for binocular fusion being a function of the range to the video object.

This can be implemented in a video system by transmitting a pulse of light and by "looking" at the scene for short sequential periods of time. Each time sequential "look" contains video from objects at sequentially increasing ranges, and therefore can be used to implement the range dependent video shift.

Figure 7:
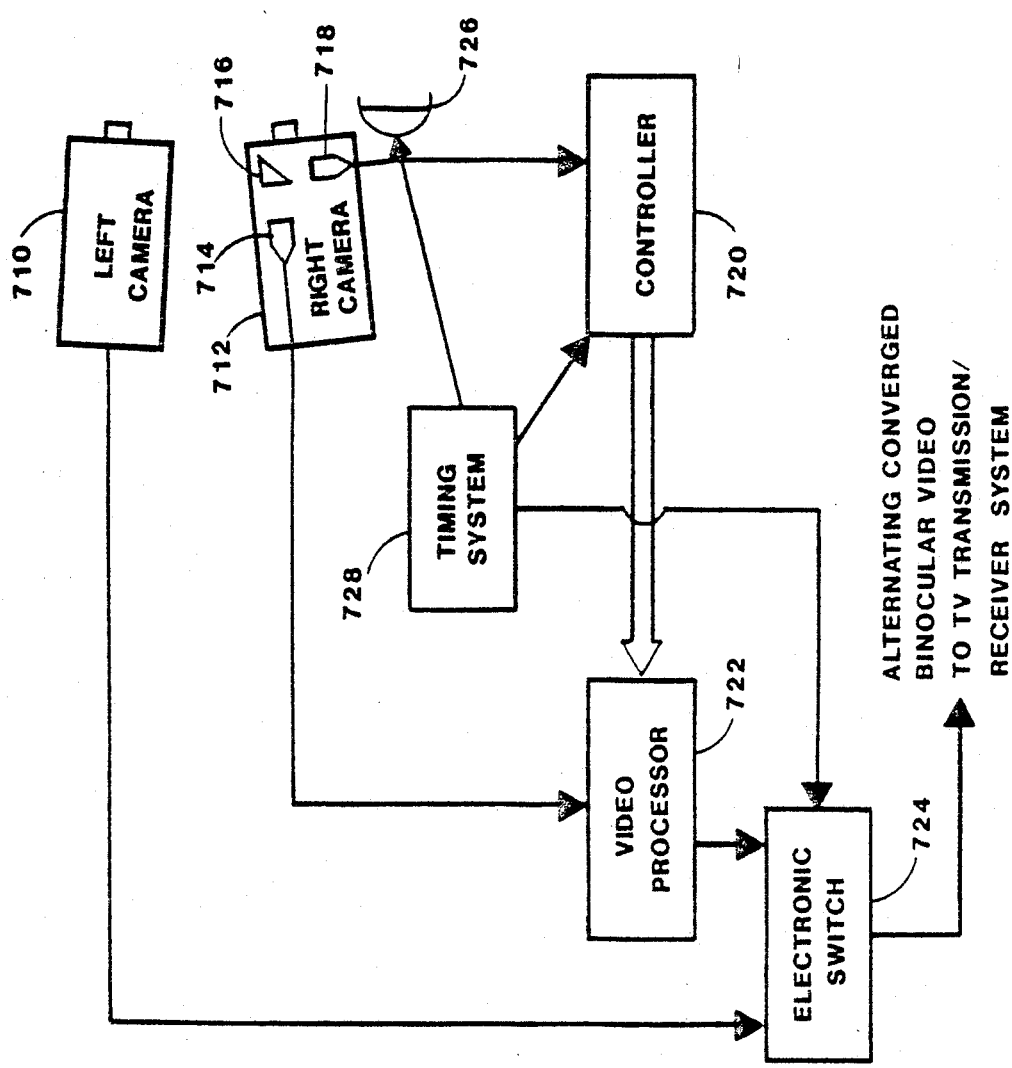
FIG. 7 is a block diagram of a pulsed light ranging and convergence system.

The light pulses can be implemented as a pulsed laser or can be a more conventional light strobe or can be implemented with a mechanical device such as the rotating mirrors used in very high speed photography. Since light travels at 300 meters per microsecond, the pulses must be short in duration, on the order of less than one microsecond and the exact time of transmission must be well controlled. Sequential sample times must also be well controlled, on the order of 20 nanoseconds. The light pulses can be in the invisible portion of the spectrum (ultraviolet or infrared), and seen only by the sensor that uses it. One embodiment of such a system is shown in FIG. 7. As before, two stereo optically related cameras 710 and 712 are used. However, camera 712 contains a prismatic mirror 716 for splitting incoming light between the normal camera sensor 714 and a sensor 718 which is sensitive to light from the flash source 726. The flash source 726 is strobed several times per second and emits a short burst of radiation on the order of one microsecond duration. The emitted radiation is reflected from the video scene and is focused by the camera optics and prism 716 on the radiation sensing element 718. The sensing element 718 may be several elements or may be a single element that sequentially samples the reflected radiation during sequential time intervals. During the first time interval, video elements in the 5 to 10 meter range may be identified, then video elements in the 5 to 20 meter range, etc. The controller 720 uses the information from sensor 718 to identify element edges and control the video processor 722 which time shifts appropriate video elements in the normal video from camera 712 such that when combined with the video from camera 710 by switching the two videos as previously described, the depth illusion will result without any limit of binocular fusion problem.

Range to an object can also be determined through triangulation. This can be implemented by mounting a third camera directly above one of the stereo cameras. With this camera converged with the camera below it on some object, corresponding video elements from the object will be in exact correspondence within a horizontal scan and vertically by horizontal scan line number. Corresponding video elements from other objects at different ranges will be at the same position within the horizontal scan, but will occur on different horizontal scan lines for the upper camera than for the lower camera. Video from one of the two cameras may be passed through delay lines (such as Fairchild Semiconductor part number CCD321A1 Broadcast Quality Video Delay Line) equal to integer multiples of a horizontal scan time. The signals from the two cameras are then processed by correspondence detection circuitry to determine in which horizontal lines corresponding elements occur, which will permit calculation of the distance of each element from the cameras. This information may be used to implement converged video selection techniques and can also be used in convergence video processing techniques.

CONVERGENCE DETECTION TECHNIQUES

The relative time of occurrence (within a horizontal scan) of corresponding video elements can be used to determine if the elements are within the limit of binocular fusion. The correspondence detector discussed in the previous paragraphs may be used to detect the corresponding video elements in the two stereo video signals. A device designed to detect when the corresponding video elements are within the limit of binocular fusion is the convergence detector. The convergence detector is designed to accept signals from the edge detectors and the signals from the correspondence detector. Referring to FIG. 1C, it can be seen that when an object is closer to the cameras than the convergence point is to the cameras, right camera video from the object will precede the corresponding left camera video. Similarly when an object is behind the circle of convergence points (FIG. 1B), left camera video from the object will precede the right camera video as the image is scanned from left to right. A convergence detector measures the time that video elements from one camera lead or lag the corresponding video elements from the other camera. If the lead or lag time is less than some (experimentally determined) threshold, then the video elements are declared to be (adequately) converged for binocular fusion, otherwise they are determined to be outside the limit of binocular fusion.

CONVERGED VIDEO SELECTION TECHNIQUES

Converged video selection techniques can also be used to eliminate the limit of binocular fusion problem from three dimensional video. Such a system is presented in FIG. 8, which shows two cameras 810 and 812 in accordance with the basic technique except the switch 814 is operated differently; that is, in conjunction with a convergence detector 830.

Figure 8:
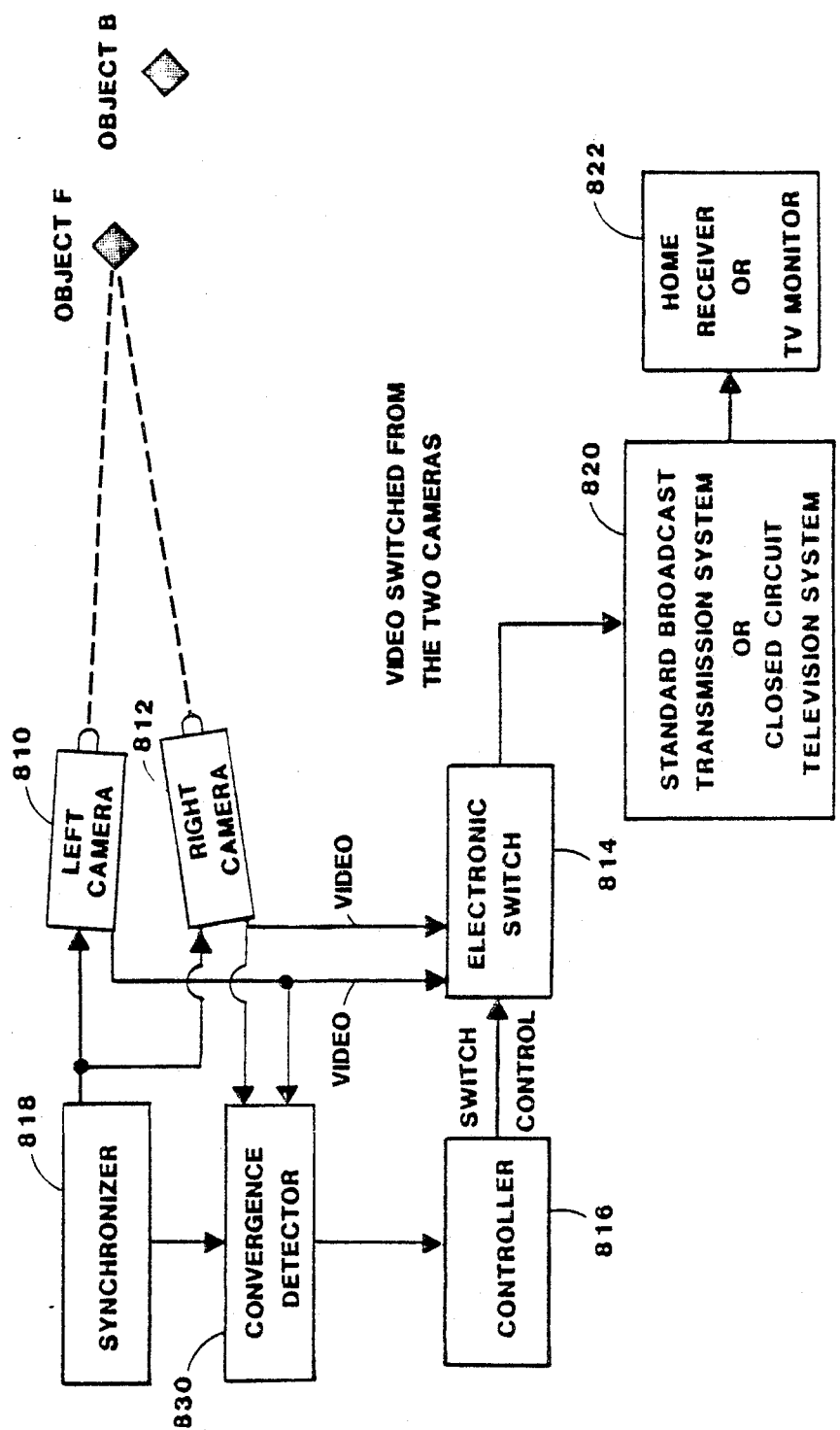
FIG. 8 is a block diagram of a system that alternates stereoscopic video elements only for objects that are within the limit of binocular fusion and produces monocular video for other objects.

Representative signals from the two cameras 810 and 812 of FIG. 8, (with the cameras converged on object F) are shown in FIG. 9. Correlation, correspondence and timing circuitry in the convergence detector 830 identifies the corresponding elements in the two video signals and measures the relative time of occurrence of the corresponding picture elements, shown in FIG. 9 as time T1 and time T2. In this case, time T1 is within the time threshold for binocular fusion and time T2 is greater than the threshold. Therefore, the circuitry first passes video from the left camera shown as switch output number 1 in FIG. 9. A short time later the circuitry passes the video shown as switch output #2 which is right camera video from object F (within the limit of binocular fusion) and left camera video from object B (since the right camera video would not be within the limit of binocular fusion. In this manner, the video for object F, which is within the limit of binocular fusion, is alternated at the previously established rate of 3 to 25 alternations per second, as appropriate. However, video from objects that would cause the binocular fusion problem, such as object B in the example of FIGS. 8 and 9, is not alternated. In summary, only video that will be within the limit of binocular fusion will be alternated at the appropriate rate, for an appropriate portion of the horizontal scan, and for all scans in each frame. Other video is continuous from one of the cameras.

Switching circuits to combine the two video signals are already available in various devices of the television industry such as "special effects" products. Gated video amplifiers such as Motorola part number MC1445 also may be used.

One variation of converged video selection techniques is to use one "master" camera and several partner stereo cameras. For example, the first of three partner stereo cameras might be converged with the master camera on the foreground objects, the second camera is converged with the master camera on midground objects and a third camera with the master camera on background objects. Multiple sets of convergence detectors and switches would be required. The first set is connected to the master camera video and the first partner stereo camera and selects and alternates the foreground object video with the master camera video. The second set is connected to the master camera video and the second partner stereo camera and selects and alternates the midground object video. A third set would function similarly. The order of mixing or switching the videos is designed so that foreground object video replaces midground video that is overlapped (for example, background video is mixed or alternated first, then midground, then foreground). In this manner, several "layers" of video can be processed adequately for binocular fusion.

Another variation that may accomplish the same results as the above described multiple camera technique with only two cameras is as follows. The two cameras are converged on the foreground objects. The right camera is used as the master camera and foreground object video from the left camera video is alternated and combined with the right camera video as in the first converged video selection technique described above. The video from the left camera is delayed a short time (300 nanoseconds for example). This brings the left camera video from the midground or next "set" of objects into the proper time and position relationship (relative to right camera video) required for binocular fusion. A second set of convergence detection and switching circuitry is used to switch the left camera midground object video with the right camera video. This sequence of delay, convergence detection and camera video alternation may be repeated several times for sets of objects at other ranges as the application requires.

CONVERGENCE PROCESSING TECHNIQUES

The previous paragraphs described methods for selecting and alternating corresponding video elements from objects that are within the limit of binocular fusion. The following paragraphs describe video processing techniques which time shift the video elements within the two stereo video signals such that all corresponding video elements are within the limit of binocular fusion.

Referring to FIG. 10, the left video and right video signals 1010 and 1012 are produced in accordance with the basic technique described above. The correspondence detector 1014 functions as previously described in connection with FIG. 10 except that it generates control signals to control the left and right video processors 1016 and 1018. Video processors 1016 and 1018 time shift the various video elements in one or both of the stereo related video signals such that the various corresponding video elements will be in a converged binocular relationship to each other as required for binocular fusion. The two video signals may then be alternated in the previously described manner to produce the depth illusion. Time shifting can be accomplished using the analog shift register capabilities of analog devices (such as Fairchild Semiconductor part number CCD321A1 or similar devices) or the video signals can be digitized and time shifting or delays can be accomplished through the use of digital memory as intermediate storage.

An analog version of a convergence video processor may be implemented as follows. The two stereo cameras are converged on the background such that all corresponding background video elements from the two cameras are in time coincidence. Video elements in the right camera video from midground and foreground objects will precede corresponding elements in the left camera video. At the beginning of each horizontal scan, video from both cameras is passed undelayed. In this implementation, left camera video is always passed undelayed. Right camera video is also passed until the correspondence detector detects noncorrespondence between the two video signals; then the right camera video is delayed until its corresponding video element appears in the left camera video and then both signals are passed. When the right camera video is delayed, control signal 1022 controls the switch 1020 to fill in the right camera video with left camera video. The timing signal controls the switch to alternate the left camera video and processed right camera video in the previously described manner at 3 to 25 alternations per second.

The three dimensional television system can also be implemented using a digital computer. Referring to FIG. 11, video L and video R come from two stereo related cameras. The video may be monochrome, or combinations of monochrome and color signals as the application requires. The timing system 1116 sends control signals to the analog to digital converters 1110 and 1112 to cause the video to be digitized at an appropriate rate for adequate signal reproduction (on the order of a few megahertz). The digitized signals from the A/D converters 1110 and 1112 are transferred to the input digital memory 1114, also under control of the timing system 1116. The sample resolution (number of bits) of the sample process should be adequate to produce the desired effect. Computer software is designed to control the computer 1118 to examine each digitized video element individually and in sequence as required to identify elements of each object in the video scene. For example, a solid colored object would have equal video words for each adjacent video sample of that object. The equal words can be identified by the computer and the extent of the object determined in the horizontal and also the vertical position for both the left and right video cameras. When corresponding video objects from the two cameras are not in a converged video relationship, computer software is designed to horizontally shift one or both of the object's digital representation so that the object videos are converged. Background video from the other stereo picture can be used to "fill in" at the edges where the object was shifted. The computer 1118 can then output the samples to the output digital memory 1120 in the appropriate sequence to reproduce the two stereo related pictures at the previously described alternation rate of the basic technique. The digital video words are converted back to analog form by the D/A converter 1122. The D/A output can be filtered, synchronization signals can be reconstructed and other signal processing techniques applied as appropriate. The result will be a stereo video picture with all objects in the picture having the appropriate alternating binocular disparity but with each corresponding binocular object properly converged so that binocular fusion can take place. Thereby, the image is reproduced having the illusion of depth but without the flicker and jump caused by the limit of binocular fusion problem.

The above method may require that the stereo video be recorded so that it can be processed at a slower than real time rate. Special purpose circuitry with "hardwired" algorithms can provide for real time processing in some applications.

In convergence processing techniques, when shifting the positions of video objects, the size, shape, color and texture of the objects should be preserved. When shifting of foreground objects reveals hidden midground object edges in one of the two stereo views, that view may be filled in with its partner stereo elements. It is not essential that background elements be alternated, since no disparity is normally perceived as background.

Although the implementations herein described are for alternating stereoscopic video systems, other systems such as those using colored or polarized glasses will be substantially improved when the video is processed as described herein to provide global convergence of the stereo images.

VERTICALLY SEPARATED STEREOSCOPIC CAMERAS

Visual perception response to the images produced by horizontally separated stereoscopic cameras is well known. The illusion of depth also results when the cameras are vertically separated. A three dimensional television system in accordance with the present invention and using vertically separated (horizontal scan) cameras may be implemented in the same manner as the system previously described for the system of FIG. 2 except the cameras are positioned one above the other. Camera separation distance should be nearly the same as before for the horizontally separated cameras. It may be necessary to decrease the separation distance slightly since the visual perception system may have a smaller vertical disparity fusion capability than is the horizontal disparity fusion capability. Switching of the two video signals is accomplished as before at the rate of 3 to 25 of each partner per second. The cameras may be focussed and converged as before and the relative exposure times may be varied for optimal effects, applying the techniques of U.S. Pat. No. 4,006,291. The vertical separation of cameras can also be applied to the technique of alternating interlaced fields as described in U.S. Pat. No. 3,457,364.

When the cameras are vertically separated, corresponding video elements in the two stereo signals occur at the same point within their respective horizontal scan lines, but may occur on different scan lines.

A block diagram of a video convergence processing system designed for vertically separated cameras is shown in FIG. 12A. With the cameras converged on the background, video elements from the lower camera will occur on the same scan line or some scan line above the scan line of the corresponding video element of the upper camera. The design of FIG. 12A assumes that the geometry of the video scene is such that each video element is within five lines of its corresponding stereo video element, but the design can be expanded as the application requires. FIG. 12B contains additional details of identical blocks 1216, 1218, 1220, 1222, 1224, and 1226 of FIB 12A.

The purpose of the system of FIG. 12A is to replace each video element of the upper camera signal 1210 with its corresponding video element from the lower camera signal 1212 and then alternate the resulting signal with the upper camera signal 1210 (whose elements have not been replaced by elements of the signal 1212) at the previously described rate of 3 to 25 of each image per second. Globally converged binocular video will result. To accomplish this, the video signal from the upper camera 1210 and the video signal from the lower camera 1212 are input to the correlation detection and switching block 1216, details of which are shown in FIG. 12B. Logical zeros are applied to both inputs of OR gate 1272 (for blocks 1216 and 1218 only). A timing signal 1264 clocks these signals into sample and hold circuits 1266 and 1268 and flipflop 1274. If the signals out of the sample and hold circuits 1266 and 1268 are adequately correlated and the signal out of flipflop 1274 is a zero, then signal 1232 from the correlation detector 1276 causes the switch 1270 to pass the lower camera video from sample and hold circuit 1268. Otherwise, the upper camera video is passed.

The purpose of the two inputs 1228 and 1230 to OR gate 1272, in subsequent blocks 1220, 1222, 1224 and 1226, is (1) to prevent upper camera signal video elements that have already been replaced from being replaced again and (2) to prevent a lower camera signal video element from replacing more than one upper camera signal video element. Signal 1232 generates the control bit to accomplish this in subsequent stages. When the correlation detector 1276 causes the switch 1270 to pass the lower camera video element, it also emits a logical 1 on signal 1232. Note that the output from block 1218 takes two paths, to block 1220 and shift register 1242. The path to block 1220 is to accomplish function (1) above, and the path to shift register 1242 is to accomplish function (2) above. The shift register 1242 provides an appropriate delay to keep the control bit synchronized with its associated video element as it is delayed by delay element 1244.

The CD/SW block 1216 will replace all background video elements. Block 1218 will replace video elements from objects just in front of the background. Note that block 1218 is connected to replace upper camera video with lower camera video from the adjacent line of the next interlaced field; hence, vertical delay block 1234 is necessary to delay the lower camera video by approximately 1/60 second.

Block 1220 replaces video elements from the next closer objects which occur in the next horizontal scan line. Horizontal delay element 1240 delays the lower camera video for one horizontal scan interval in order to bring the lower camera video into time coincidence with upper camera video two scan lines below it.

The process is repeated until upper camera video has been processed with lower camera video of the same horizontal scan line and the five horizontal lines above it.

Delay element 1254 delays the unmodified upper camera video an appropriate amount to synchronize the two signals into the switch 1256. Synchronization generator 1262 and controller 1260 provide signals to the switch 1256 to alternate the two videos at 3 to 25 of each image per second, and globally converged alternating binocular video results.

The system of FIG. 12A can be implemented in an analog form or the video signals can be digitized and the described system implemented via digital circuits. In the analog approach the delay elements can be implemented with the previously described Fairchild part number CCD321A1. The digital approach uses digital memory as the delay elements.

VERTICALLY SCANNED HORIZONTALLY SEPARATED STEREOSCOPIC CAMERAS

The previously described vertically separated camera system is a particularly reliable and easily implementable method of producing globally converged stereoscopic video, and can be implemented with standard horizontally scanned cameras. However, the 3D effect from vertical disparity may not be as good as horizontal disparity. A similar system but using horizontal disparity can be implemented with vertically scanned cameras. The system of FIG. 12A will function properly as long as the camera separation is orthogonal to the camera scan direction.

A three dimensional television system in accordance with the present invention and employing vertically scanned TV cameras may be implemented as follows. The system should be in accordance with the system previously described for the system of FIG. 2 except vertically scanned TV cameras are used. With cameras scanning from bottom to top, and interlaced scan lines sequencing from left to right, the left camera video should be connected to video input 1210 in FIG. 12A. Right camera video should be connected to video input 1212. The system of FIG. 12A functions as previously described.

The globally converged binocular video thus produced would produce a picture 90 degrees from upright on a standard broadcast system and standard TV receiver. However, it can be converted to a compatible video signal with a scan conversion system consisting of an array of video storage elements such as Fairchild part number CCD321A1. Each scan line of video is temporarily stored in a storage element until a complete frame is stored. The video is scanned out, one video element from each scan line progressing left to right such that one horizontal line of video is produced, the top line first, then the second line, then the third line, thus progressing until all video is output. Alternate video lines are delayed for approximately 1/60 second to provide for the standard interlaced fields. It may be necessary to have two storage arrays so that video can be stored in one array while the previous frame is processed out of the other array.

The vertically scanned cameras can be high resolution cameras to assure that the video produced is of broadcast quality.

Figure 13:
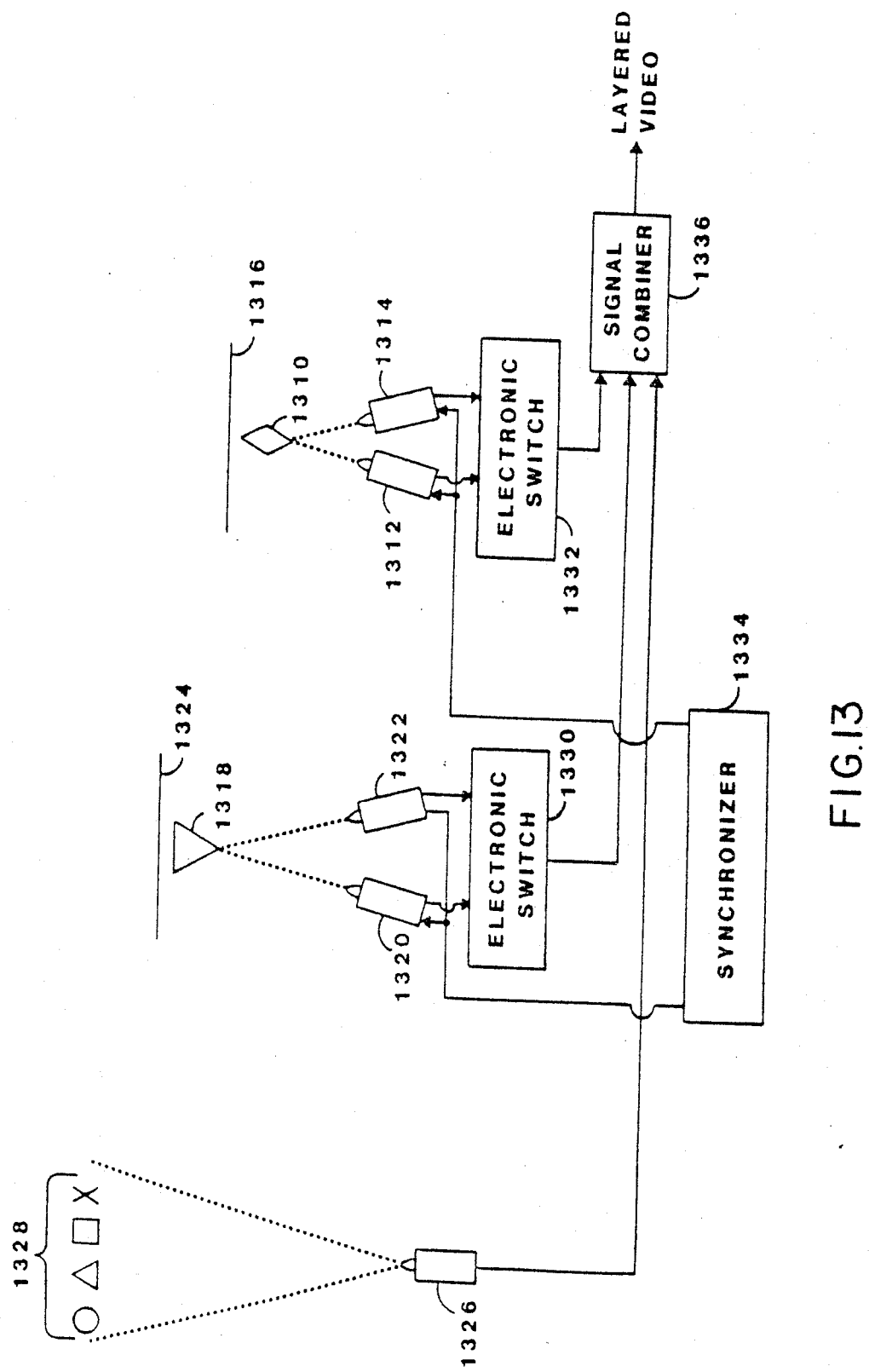
FIG. 13 is a block diagram of a system in accordance with the present invention which utilizes layered video techniques in order to produce alternating signals in binocular relationship.

FIG. 13 illustrates implementation of a layered video system designed to produce globally converged binocular video. Such a system separately produces stereo video images of only foreground object 1310, which is located approximately equal distances from a pair of foreground camera 1312, and 1314 and in front of a solid colored background 1316. Midground object 1318 is located approximately equal distances from a second pair of cameras 1320 and 1322 and in front of a solid color background 1324. A separate monocular video camera 1326 produces a monocular video image of only background objects 1328. The video images coming from the background camera 1328, midground cameras 1320 and 1322 and foreground cameras 1312 and 1314 are combined under the control of electronic switches 1330 and 1332 and a synchronizer 1334 as described in the text associated with FIG. 2 above, such that the solid color background of the midground video from midground cameras 1320 and 1322 is replaced by corresponding portions of the monocular background objects video from background camera 1326, and the solid color background of the foreground video from foreground cameras 1312 and 1314 is replaced by corresponding portions of the combined midground and background video.

I claim:

1. A method of displaying a stereo pair of images to present a single, three dimensional, sharply focused, flicker-free image to human visual perception comprising the steps of:
    (a) positioning a pair of video cameras in stereo relation to each other to view a scene,
    (b) displaying the video signal from first one camera,
    (c) displaying the video signal from the second camera in registration with the display of the first signal, in binocular relationship to the first signal and for approximately the same period as the first signal,
    (d) switching between display of the first and second signals at a rate between 3 and 25 of each image per second, and
    (e) monitoring the light level of the scene and increasing the rate of switching between display of the first and second signals responsive to higher light levels.

2. A television system for displaying a three dimensional, sharply focused, flicker-free image to human visual perception, comprising:
    (a) a pair of video cameras positioned in stereo relation to each other to view a scene,
    (b) means for transmitting the video signal from first one of the pair of cameras and then the other camera for approximately equal periods and switching between the video signals from the first and second camera at a rate between 3 and 25 of each image per second, and
    (c) means for receiving the transmitted video signals and displaying such signals in registration and in binocular relationship to each other, said binocular relation displaying means comprising:
        (i) means for measuring the characteristics of each of the two video signals,
        (ii) means for comparing the characteristics and time occurrence of video elements within each of the two video signals,
        (iii) means for identifying corresponding video elements within each of the two video signals not within the limits of human binocular fusion, and
        (iv) means for processing the video signal from the one camera to time shift the video elements not within the limits of binocular fusion to bring such elements within the limits of binocular fusion when the processed video signal is displayed together with the video signal from the other camera.

3. A method for producing a pair of stereo scopic images, the corresponding objects of which are within a viewer's limit of binocular fusion comprising the steps of:
- (a) repositioning the corresponding objects in the two images to corresponding positions such that when the two images are superimposed the video objects at all ranges coincide; and
- (b) filling in voids created in each image by such repositioning of the objects by using corresponding image elements from the other image.

4. A method of displaying a stereo pair of images to present a single, three dimensional, sharply focused, flicker-free image to human visual perception comprising the steps of:
- (a) separately producing stereo video images of only foreground objects located approximately equal distances from a first pair of cameras against a solid color background,
- (b) separately producing stereo video images of only midground objects located approximately equal distances from a second pair of cameras against a solid color background,
- (c) separately producing monocular video of only background objects,
- (d) combining the foreground, midground and background video images such that the solid color background of the midground video is replaced by corresponding portions of the monocular background objects video and the solid color background of the foreground video is replaced by corresponding portions of the combined midground and background video,
- (e) displaying first the combined video signal from the background video and one camera of each of the pairs of foreground and midground cameras,
- (f) displaying the combined video signal from the background video and the other cameras of the pairs of foreground and midground cameras in registration with the display of the first signal, in binocular relationship to the first signal and for approximately the same period as the first signal, and
- (g) switching between display of the first and second signals at a rate between 3 and 25 of each image per second.

5. The method in accordance with claim 4 further comprising the step of displaying the second signal for a substantially shorter period than display of the first signal.

6. A method of displaying a stereo pair of images to present a single, three dimensional, sharply focused, flicker-free image to human visual perception comprising the steps of:
- (a) positioning a pair of vertical scan video cameras in stereo relation to each other to view a scene,
- (b) displaying the video signal from first one camera,
- (c) displaying the video signal from the second camera in registration with the display of the first signal, in binocular relationship to the first signal and for approximately the same period as the first signal, and
- (d) switching between display of the first and second signals at a rate between 3 and 25 of each image per second.

7. The method in accordance with claim 6 further comprising the step of displaying the second signal for a substantially shorter period than display of the first signal.

8. A method of displaying a stereo pair of images to present a single, three dimensional, sharply focused, flicker-free image to human visual perception comprising the steps of:
- (a) positioning a pair of video cameras in stereo relation to each other to view a scene,
- (b) processing the signals from the cameras to identify the video elements within the scene which are not within the limit of binocular fusion and elements that are within the limit of binocular fusion,
- (c) combining the video signals from the cameras such that video elements which are within the limit of binocular fusion are alternately displayed for approximately equal periods, alternating at a rate between 3 and 25 of each image per second, and
- (d) displaying video signals from only one of the cameras continuously for video elements not within the limit of binocular fusion.

9. The method in accordance with claim 8 further comprising the step of positioning the video cameras one above the other.

10. The method in accordance with claim 8 further comprising the step of using video cameras which are vertical scan video cameras.

11. The method in accordance with claim 8 further comprising the step of displaying the second signal for a substantially shorter period than display of the first signal.

12. A method of displaying a stereo pair of images to present a single three dimensional, sharply focused, flicker-free image to human visual perception comprising the steps of:
- (a) positioning a plurality of pairs of video cameras to view a scene such that the cameras of each pair are in stereo relation to each other and each pair of cameras is converged at a different distance within the scene,
- (b) synthesizing a first composite video signal depicting the scene from one of the cameras in each pair of cameras utilizing convergence detector circuitry, switching circuitry and layered video circuitry,
- (c) displaying the first video signal,
- (d) synthesizing a second composite video signal depicting the scene from the other camera in each pair of cameras utilizing convergence detector circuitry, switching circuitry and layered video circuitry,
- (e) displaying the second video signal in registration with the display of the first signal, in binocular relationship to the first signal and for approximately the same period as the first signal, and
- (f) switching between display of the first and second composite video signals at a rate between 3 and 25 of each image per second.

13. The method in accordance with claim 12 further comprising the step of positioning the video cameras within each pair of cameras one above the other.

14. The method in accordance with claim 12 further comprising the step of using video cameras which are vertical scan video cameras.

15. The method in accordance with claim 12 further comprising the step of displaying the second signal within each pair of signals for a substantially shorter period than display of the first signal.

16. A method of displaying a stereo pair of images to present a single, three dimensional, sharply focused, flicker-free image to human visual perception comprising the steps of:
- (1) positioning a pair of video cameras in stereo relation to each other to view a scene,
- (2) displaying the video signal from first one camera,
- (3) displaying the video signal from the second camera:
  - (i) in binocular relationship to the first signal by:
    - (a) measuring the characteristics of each of the two video signals,
    - (b) comparing the characteristics and time occurrence of video elements within each of the two video signals,
    - (c) identifying corresponding video elements within each of the two video signals not within the limits of human binocular fusion, and
    - (d) processing the video signal from one camera to time shift the video elements not within the limits of binocular fusion to bring such elements within the limit of binocular fusion when the processed video signal is displayed together with the video signal from the second camera in accordance with said switching step,
  - (ii) in registration with the display of the first signal and
  - (iii) for approximately the same period as the first signal, and
- (4) switching between display of the first and second signals at a rate between 3 and 25 of each image per second.

17. The method in accordance with claim 16 further comprising the step of positioning the video cameras one above the other.

18. The method in accordance with claim 16 further comprising the step of using video cameras which are vertical scan video cameras.

19. The method in accordance with claim 16 further comprising the step of alternating the two video signals at the field alternation rate such that one signal is displayed in one interlaced field and the other signal is displayed in the other interlaced field.

20. The method in accordance with claim 16 further comprising the step of displaying the second signal for a substantially shorter period than display of the first 21. The method in accordance with claim 16 wherein said comparing step is performed by detecting the edges of video objects and comparing the characteristics of video elements within such objects.

22. The method in accordance with claim 21 further comprising the step of displaying the second signal for a substantially shorter period than display of the first signal.

23. The method in accordance with claim 16 wherein said identifying step is performed by backlighting some objects in the video scene with light invisible to the video camera and detecting object elements so backlit.

24. The method in accordance with claim 23 further comprising the step of displaying the second signal for a substantially shorter period than display of the first signal.

25. The method in accordance with claim 16 wherein said identifying step is performed by range gating utilizing pulsed electromagnetic radiation.

26. The method in accordance with claim 25 further comprising the step of displaying the second signal for a substantially shorter period than display of the first signal.

27. The method of claim 4 wherein said video signal processing step includes time delay shifting, by different delay periods, of at least two video elements within one of the video signals.

28. The method in accordance with claim 27 further comprising the step of positioning the video cameras one above the other.

29. The method in accordance with claim 27 further comprising the step of using video cameras which are vertical scan video cameras.

30. The method in accordance with claim 27 further comprising the step of displaying the second signal for a substantially shorter period than display of the first signal.

* * * * *

UNITED STATES PATENT AND TRADEMARK OFFICE
CERTIFICATE OF CORRECTION

PATENT NO. : 4,567,513
DATED : January 28, 1986
INVENTOR(S) : Donald J. Imsand

It is certified that error appears in the above—identified patent and that said Letters Patent is hereby corrected as shown below:

Column 22, line 29, the claim reference numeral "4" should read -16-.

Signed and Sealed this

Twenty-seventh Day of May 1986

[SEAL]

Attest:

Attesting Officer

DONALD J. QUIGG

Commissioner of Patents and Trademarks